(12) United States Patent
Nunes

(10) Patent No.: US 6,793,498 B1
(45) Date of Patent: Sep. 21, 2004

(54) COMPUTER ASSISTED LEARNING SYSTEM

(76) Inventor: Aubrey Nunes, 52 Bonham Road, London (GB), SW2 5HG ( * ) Notice: Subject to any disclaimer, the term of this patent is extended or adjusted under 35 U.S.C. 154(b) by 0 days.

(21) Appl. No.: 09/719,345

(22) PCT Filed: Jun. 9, 1999

(86) PCT No.: PCT/GB99/01829
§ 371 (c)(1),
(2), (4) Date: Dec. 8, 2000

(87) PCT Pub. No.: WO99/65008
PCT Pub. Date: Dec. 16, 1999

(30) Foreign Application Priority Data

Jun. 9, 1998 (GB) .............................................. 9812435

(51) Int. Cl.[7] .............................................. G09B 7/00
(52) U.S. Cl. ........................ 434/322; 434/323; 434/362
(58) Field of Search ................................ 434/322, 323, 434/350, 362

(56) References Cited

U.S. PATENT DOCUMENTS

| | | | | |
|---|---|---|---|---|
| 5,211,563 A | * | 5/1993 | Haga et al. ................. | 434/322 |
| 5,306,154 A | | 4/1994 | Ujita et al. | |
| 5,395,243 A | * | 3/1995 | Lubin et al. ................ | 434/118 |
| 5,506,937 A | * | 4/1996 | Ford et al. ................. | 706/11 X |
| 5,597,312 A | * | 1/1997 | Bloom et al. ........... | 434/362 X |
| 5,681,170 A | | 10/1997 | Rieber et al. | |
| 5,696,885 A | * | 12/1997 | Hekmatpour ............. | 706/59 X |
| 5,779,486 A | * | 7/1998 | Ho et al. ................. | 434/353 X |
| 5,813,863 A | * | 9/1998 | Sloane et al. ........... | 434/236 X |
| 5,820,386 A | * | 10/1998 | Sheppard, II ........... | 434/322 X |
| 5,870,731 A | * | 2/1999 | Trif et al. ................. | 706/52 X |
| 5,957,699 A | * | 9/1999 | Peterson et al. ........ | 434/350 X |
| 6,062,862 A | * | 5/2000 | Koskinen .................... | 434/107 |
| 6,077,085 A | * | 6/2000 | Parry et al. ............. | 434/322 X |
| 6,091,930 A | * | 7/2000 | Mortimer et al. ....... | 434/362 X |
| 6,118,973 A | * | 9/2000 | Ho et al. ................. | 434/362 X |
| 6,146,147 A | * | 11/2000 | Wasowicz ............... | 434/169 X |
| 6,299,452 B1 | * | 10/2001 | Wasowicz et al. ...... | 434/178 X |
| 6,331,115 B1 | * | 12/2001 | Jenkins et al. .......... | 434/169 X |
| 6,361,326 B1 | * | 3/2002 | Fontana et al. ......... | 434/322 X |
| 6,386,883 B2 | * | 5/2002 | Siefert .................... | 434/322 X |
| 6,447,299 B1 | * | 9/2002 | Boon .................... | 434/156 X |
| 6,501,937 B1 | * | 12/2002 | Ho et al. ................ | 434/362 X |

FOREIGN PATENT DOCUMENTS

| | | |
|---|---|---|
| EP | 0710943 A2 | 8/1996 |
| EP | 0838798 A1 | 4/1998 |
| GB | 2289365 A | 11/1995 |
| GB | 2321120 A | 7/1998 |
| WO | WO 9960546 A2 | 11/1999 |

* cited by examiner

Primary Examiner—Jessica Harrison
Assistant Examiner—Chanda L. Harris
(74) Attorney, Agent, or Firm—Locke Liddell & Sapp LLP

(57) ABSTRACT

The system is loaded with a database of developmental networks and associated activity modules. The user selects a node in a developmental network and an associated activity module is activated which gives the student a multimedia presentation of some area of learning. The student's responses are evaluated and the corresponding node is marked as passed or failed accordingly. The nodes in a network are connected by links between nodes for a skill and nodes for easier skills that a student should have, it is expected, if the student has that skill. The student'schoice of activity if restricted according to which nodes in a network have been failed. Interfaces for allowing the user to make a selection among the available nodes are also disclosed.

114 Claims, 4 Drawing Sheets

COMPUTER ASSISTED LEARNING SYSTEM

The present invention relates to computer assisted learning systems in general whether the learner is an adult, a child or otherwise, which may include the case where the learner is a heuristic computer system.

Some computer assisted learning systems structure the activities that a user may engage in according to their difficulty, and the activities are presented to the user, the learner, in that order. In some systems the user may have an entirely free choice of which activity to attempt next. Either way the user may suffer frustration or boredom because he or she will choose activities at random, or be presented activities, which are too easy or too hard and hence which are of no benefit to the user.

It is an object of the invention to provide a system that to some extent guides the user to appropriate activities.

Preferably some choice is left to the user which emphasizes and exercises responsibility and helps to maintain his or her interest.

In a preferred embodiment the system allows the separation of the user interface and the educational content, which facilitates the development educational aspects of a system, lets the user configure the interface to suit him or herself, and allows the same material to be used across a wide range of age and (dis)ability.

The invention makes use of what are termed herein as developmental networks which encode information as to the relative difficulty of the various skills that a user is to attain. As will be described below the skills are not simply arranged into a linear order.

According to the present invention there is provided a computer assisted learning apparatus for operating upon a database comprising at least one developmental network, the network having a plurality of nodes, each representing a developmental skill or an inference concerning such a skill, and links between nodes, each link being between a node for a first skill and a node for a second easier skill, the database further comprising interactive activity modules associated with the nodes, the apparatus comprising means for allowing an interactive activity module defined in the database to be selected, means for presenting a selected activity module defined in the database to the user whether visually, audibly or otherwise, means for allowing the user to interact with an activity so presented, means for recording at least some or the user's actions during or responses to the presented activity, and means for evaluating at least some of those recorded actions or responses to decide, or provide an inference as to, whether the user has attained a skill associated with a node, and access prevention means operative in respect of at least a particular node of a network at least for some of the time, for preventing the user from accessing an activity module associated with that particular node according to some criterion based, at least in part, on the results of the said evaluation for at least one activity module associated with at least one other node of the said network.

Further, the present invention also provides a computer assisted learning program for operating upon a database comprising a least one developmental network, the network having a plurality of nodes, each representing a developmental skill or an inference concerning such a skill, and links between nodes, each link being between a node for a first skill and a node for a second easier skill, the database further comprising interactive activity modules associated with the nodes, the program comprising means for allowing an interactive activity module defined in the database to be chosen by the user, means for presenting a selected activity module defined in the database to the user whether visually, audibly or otherwise, means for allowing the user to interact with an activity so presented, means for recording at least some of the user's actions during or responses to the presented activity, and means for evaluating at least some of those recorded actions or responses to decide, or provide an inference as to, whether the user has attained a skill associated with a node, and access prevention means operative in respect of at least a particular node of a network at least for some of the time, for preventing the user from choosing an activity module associated with that particular node according to some criterion based, at least in part, on the results of the said evaluation for at least one activity module associated with at least one node of the said network.

The said criterion may be based, at least in part, on the results of the said evaluation for at least one activity module associated with at least one node for an easier skill connected to the particular node either by a single said link or by more than one of said links, each of those links being in the direction of a harder skill to an easier skill.

The means for presenting an activity module may be capable of passing to an activity module arguments associated with a particular one of a plurality of nodes associated with that activity module, those arguments defining or adding to a definition of the skill represented by the node.

The apparatus may comprise means for presenting an activity module for one or more items in an electronic encyclopaedia.

The apparatus may comprise means for allowing a user to record an audio track of their own voice, for storing that track in association with a node and for allowing the user to replay that rack.

The means for recording responses may include an on screen keyboard.

The means for evaluating the recorded responses or actions may comprise a means for marking the recorded responses and for providing corresponding marks.

The evaluating means may comprise means for reducing the marks provided by the means for marking to one or more statistics.

The evaluating means and/or the access preventing means may produce or maintain at least one flag or value indicating whether the skill represented by a node has been attained by a user and/or whether the node is accessible to the user. The said at least one flag or value may indicate, from time to time, the following conditions: that the user has not attempted an activity module associated with the node, that the user has attempted an activity module associated with the node but has not attained the skill that the node represents, and that the user has attained the skill that the node represents. The said at least one flag or value may indicate, from time to time, the following condition: that the node is to be accessible to the user despite the user having attempted an activity module associated with the node but has not attained the skill that the node represents. The said at least one flag or value may indicate, from time to time, the following condition: that the node is to be accessible to the user irrespective of whether the user has attempted an associated activity module or has attained the skill that the node represents.

The said access prevention means may be arranged to prevent access to nodes for which the user has attempted an associated activity module but has not attained the skill that the node represents. The said access prevention means may allow, after a period, access to a node for which an associated activity module has been attempted but for which the skill that the node represents has not been attained. The said means or preventing access to nodes may allow access to a node for which the user has attempted an associated activity module but has not attained the skill that the node represents once the user has subsequently attained the skill for an easier node that is connected to that node via a certain number of links, each in the direction of a node for a harder skill to one for an easier skill. That certain number of links may be one. Alternatively the said period may be a predetermined period of time.

The said access prevention means may be arranged not to prevent access to a node merely for the reason that the user has attempted an activity module associated with that node but has no attained the skill that that node represents.

The said means for preventing access may always allow access to a root nose, a root node being a node having no nodes for easier skills linked to it.

The means for preventing access may be arranged not to prevent access to a node elected by a user to be accessible.

The said criterion may be based on which of the routes from a particular node to a root node has a node for which the user has attempted an easier skill but has not attained that skill, the links making up said routes always being in the direction of a harder skill to an easier skill.

The access prevention means may be arranged to prevent access to an activity module associated with a node if on the only such route or any one of such routes there is such a said node.

The access prevention means may be arranged to prevent access to an activity module associated with a node if on the only such route or on all of such routes there such a said node.

The access prevention means may be arranged to prevent access based on fuzzy or inferential logic criteria. That is to say the evaluation of the user's actions during or responses to an activity module may be more complex than simply saying the user has passed or failed a node.

The apparatus may comprise a search engine for allowing a user to enter one or more keywords and for returning a list of activity modules that are associated with the keywords and that are not prohibited to the user by the preventing means.

The apparatus may comprise means for presenting the activity modules allowed to a user by the preventing means into a hierarchical system of menus for presentation to the user. At least some of the items on at least one of the said menus may be presented graphically.

The apparatus may comprise means for displaying a graphic having a layout corresponding to the interconnection of the network and may allow the user to select among the activity modules associated with that network that are allowed to the user by the access prevention means. The means for displaying a graphic may hide portions of the graphic representing nodes inaccessible to the user.

The apparatus may comprise means for presenting a list of activity modules accessible to the user with the activity modules for nodes in the same network as the or a node associated with the last activity module attempted by the user being presented first.

The apparatus may be arranged to allow the user to select from among encyclopaedia entries allowed to the user by the preventing means.

The system may, however, be arranged to choose activities for the user from those accessible to the user. Preferably the system is arranged to present the available activities in turn cycling between them.

The apparatus may be operable with an activity module for which the evaluation means operates to decide whether the user has attained the skills of at least two different nodes. Those two said nodes may be in the same or different networks.

The apparatus may be arranged to allow navigation between related networks, the representation of said networks including links for that purpose.

The apparatus may be arranged to place restrictions on the user's navigation between networks based on the results of the said evaluation for nodes of those networks.

The apparatus may be arranged to guide the user, when moving between one network and another linked to it, to a particular node in said latter network, the identity of that node being recorded in the representation of said networks.

The apparatus may be for operating on a network defined by a set of developmental criteria and whose representation records those criteria or the degree or difficulty of individual nodes of the network with respect to those criteria, and the apparatus may comprise selection means for selecting from the nodes in a network allowed to a user by the access prevention means, one or more nodes having a selected degree or degrees of difficulty with respect to the developmental criteria. The said selected degree or degrees of difficulty with respect to a particular developmental criterion may be a certain degree of difficulty and all possible greater degrees of difficulty with respect to that developmental criterion. The said selection means may be arranged to offer the user a choice among a group of nodes selected by the selection means only once the size of that group is below a certain size. If the said group of nodes is above the said certain size the selection means may be arranged to adjust, or allow the user to adjust, the degrees of difficulty used to make the said selection of nodes.

According to the present invention, there is also provided apparatus arranged to generate from a set of developmental criteria relating to aspects of the difficulty of a set of skills a network fox use with computer assisted learning apparatus.

An embodiment of the invention will now be described, by way of example only, with reference to the accompanying drawings, of which:

On using a system according to the present invention, loaded with an appropriate database, the user of the system, a student, is allowed to choose for him or herself a learning activity to perform. That choice is, however, restricted by the system in a manner described below according to the student's past performance as measured by the system.

Figure 1:
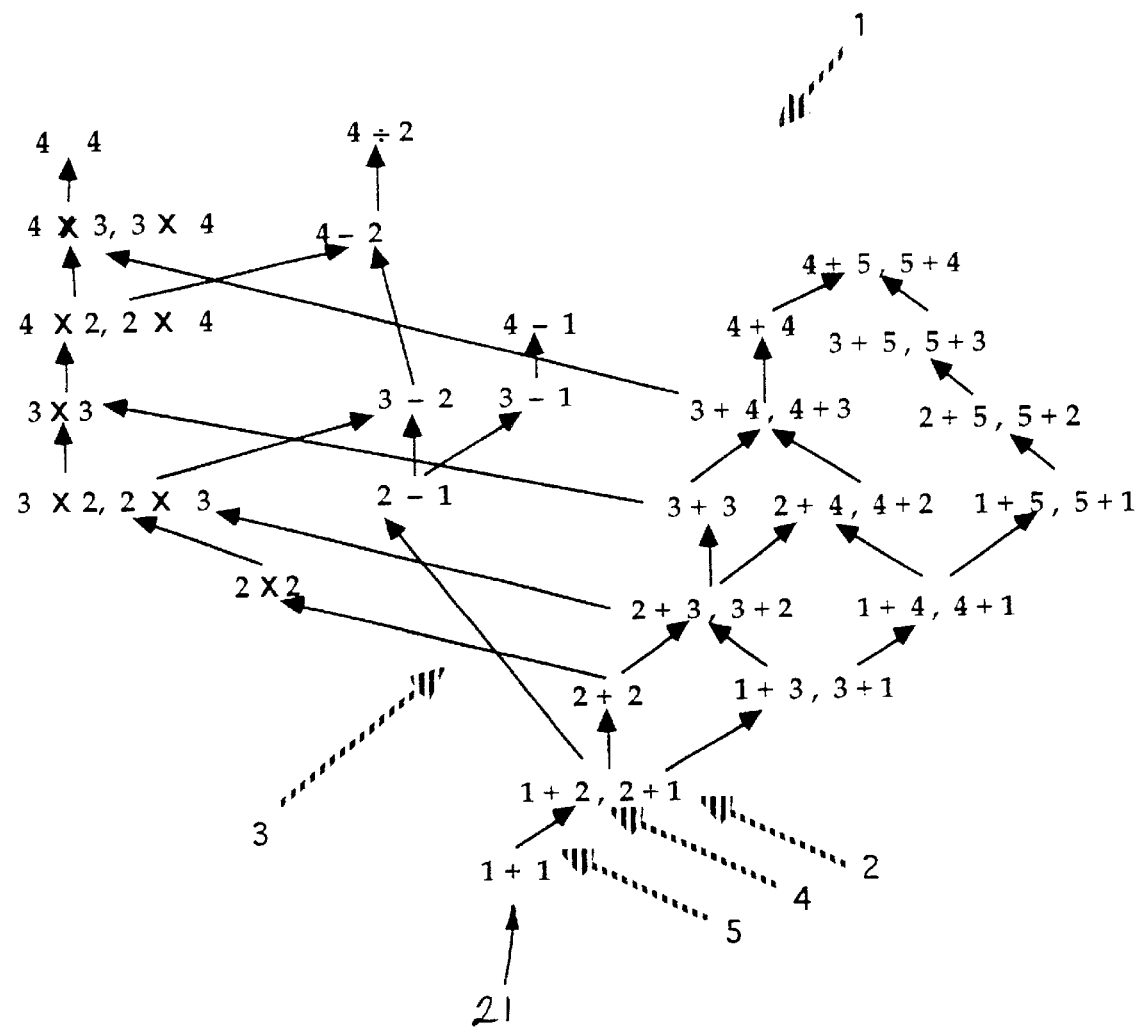
FIG. 1 is an example of a developmental network used in the present invention.

FIG. 1 Shows an example of what is termed herein as a developmental network 1. This example is for basic numeracy skills. Each node 2 of a developmental network represents a skill to be acquired by the student. In this example, each skill is simple addition, subtraction, multiplication or division. The skills are linked by arrows 3 that represent what are termed herein as developmental implications. These developmental implications encode the expectation that if a student has attained a skill at the head end 4 of the arrow then he or she will already have attained the skill at the tail end 5. The reason why the term implication is chosen is illustrated by the following. In a network comprising nodes A, B, C and D it is expected that if a student has attained either skill B or C then he or she will have attained the easier skill A. It is also expected in this example that if he or she has attained skill D then he or he will have attained easier skill B and/or easier skill C. With those implications it is also expected that if he or she has attained skill D then he or she will also shove attained skill A, but those implications do not lead to any expectation between skills B and C. The directions of the arrows are the directions in which a student would be expected to progress and so are the reverse of the directions of the "implications" described above.

The system of the present invention may work either with manually predefined networks or with networks that are generated automatically, either beforehand or as necessary during the operation of the system, from sets of what are termed herein as developmental criteria as will be explained below.

Figure 2:
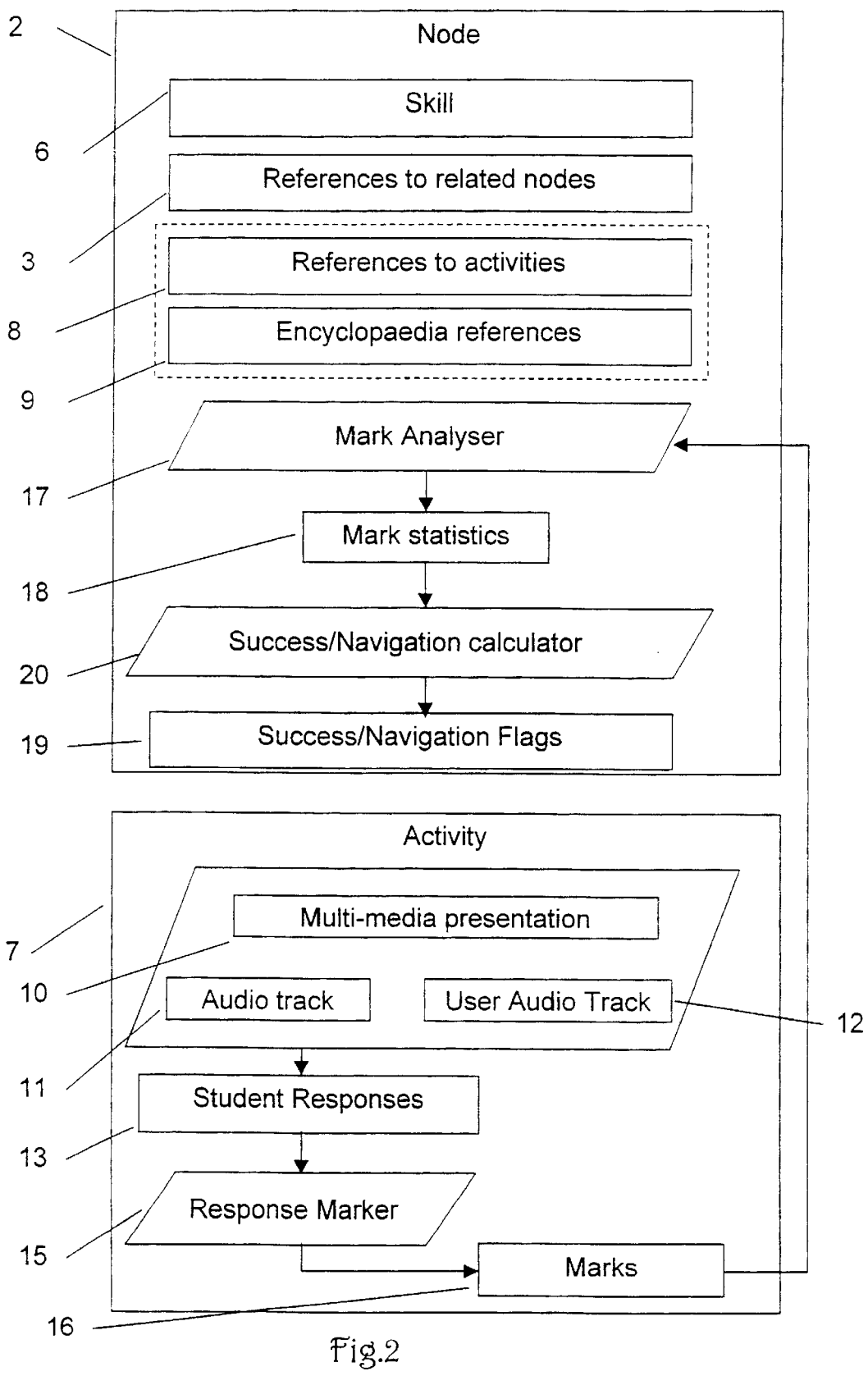
FIG. 2 is a representation of a node of a developmental network and an associated activity module in an embodiment of the invention.

FIG. 2 represents node and activity modules, or objects (in the terminology of object oriented programming), within an embodiment of the system of the present invention.

Each node object represents a node 2 in a developmental network such as exemplified by FIG. 1 and records a brief description 6 of the skill to be acquired and references 3 to related nodes, which references encode the information represented by the arrows 3 in FIG. 1. Each node 2 also records references 8 to one or more activity modules. Those may also include references 9 to activity modules representing entries in an encyclopaedia. The referenced encyclopaedia entries when activated in general present the user with some educational material relevant to the node's skill more in the form of raw information than the other activity modules like a traditional encyclopaedia. The activity modules including encyclopaedia entries may have the user perform some task, the responses to which are monitored and are used by the apparatus of the invention to provide feedback to limit the user's choice of which nodes and hence which activity modules and encyclopaedia entries he or she may visit. There need not be an individual activity module for each node. A module may be shared by several nodes each passing different arguments to it and for that purpose the arguments may be stored in the node 2 associated with the encyclopaedia or activity module reference. In the example of FIG. 1, a single activity module could be shared by all of the nodes for addition with the arguments stored being the integers to be added. A single activity module for the encyclopaedia may be provided with the node storing the headword for a particular entry and the activity module being arranged to look up the material under that headword in an encyclopaedia database. An activity module may not necessarily subject the user to a monitored task but, unless that occurs, visiting a module will not provide or add to the said limitation on which activity modules he or she may visit.

As mentioned above, the system guides a student to select a particular learning activity and in use the system is provided for that purpose with a database of activity objects or modules. Once activated an activity object 7 gives multimedia presentations 10 to the student. Each presentation may include textual, graphical, video and audio information to facilitate the student's acquiring a skill.

Each task for the student is characterized as having an input and an output, the input being the information necessary to solve the task and the output being the required response. For example, an activity module related to the easiest node of the exemplary developmental network of FIG. 1 may present the input and output together in the expression "One and One makes two". This presentation is either by on-line speech synthesis or by an assembling a corresponding set of sound files, sampled recording of natural speech. Whether much or little information is presented to the user, the presentation enters a test phase during which the user's responses 13 are recorded. Once the user has gone beyond a given point, there is no way of either exiting the system or trying anything else without going through this test phase. In the test phase, only the input is given, either reworked as a question, "What does one and one make?" or as an incompleted sentence, "one and one makes . . . ".

The system is preferably arranged to allow the user to decide when the test phase is entered. Until that point the system may be arranged to loop, presenting a variety of activities and games.

Reflecting what are obviously wide differences in educational attainment, the balance between presentations with graphical objects and with arbitrary symbols whether letters or numerals, is one between networks. If a user fails to complete a task or activity with numerals he or she may be given the option of attempting the same task with objects. The user who fails to add one and one presented as spoken numerals can be given a related, but simpler, task involving the same numbers of multimedia objects, such as apples and a bag to count them into or spoken words subject to grouping transformation and so on. By the same token, if the user can succeed at a given task carried out with objects he or she may elect to attempt a similar task with written numerals. This transition from a lower to a higher ranked network is at the discretion of the user, but, it is also subject to evaluation by the system and determinable by the system without the user's intervention. For the user unaware of the issues involved, not to mention the terminology, the management of this transition by an abstract graphic is appropriate.

Objects represented concretely are treated as being in a different lower ranked network than they are when represented by letters or numerals. Effectively, this corresponds to the difference between school and nursery. Nodes defined on related sets of elements in separate networks are defined as sharing a property. Preferably, an audio track 11 is played as described and the user is allowed to record his or her own track 12 with the instruction that he or she repeats the predefined track. This user track may be replayed at will by the user and may be saved for that purpose for a time when the user revisits the node. This recording of the lesson in the student's own voice is thought to be an effective aid to learning.

An opportunity to perform practice tasks during which the student's responses are not recorded may also be given and the distinction between practice and test tasks may be hidden from the student as appropriate.

Where the user is to make the responses, or indeed any other form of input to the system, in textual form, the user may use the standard keyboard or a special on-screen keyboard with either suitably restricted or, suitably enhanced functionality may be provided. Suitable restrictions include the elimination of all punctuation other than the full stop. Suitable enhancements include the automatic capitalization of all letters not preceded by another character or preceded by a full stop. The lower the user's sophistication and keyboard skills, he more likely it is that the on-screen keyboard will be preferred.

The recorded responses 13 are processed through several stages of analysis. First, a response marker 15 marks each unit of the user's response. A unit of response may be a single typed answer to a single question, or example "2" in response to "What is 1 plus 1?" but it may be also a set of answers or mouse clicks that the user must make to complete a response. For example, {"2", "4", "6", "8"} are the responses expected to the question "Which are the even numbers less than 10?" The response marker 15 provides a mark for each unit of response, which may be simply right or wrong but may also be a grade. For example if the response to the last example question above were {"2", "4", "8"} that would be almost correct. For younger users a response set may have between 4 and 8 items; for older users sets may be larger. A response set may be evaluated by scanning from left to right or right to left or both and its mark may be determined by inference rules.

To provide encouragement, incorrect responses may cause the activity module to present the user with another opportunity to provide a correct response and that action of allowing a repeat attempt may be factored into the mark provided by the response marker 15. A unit of response may also be a set of responses to a set of prompts where the expected responses are correlated.

The set of marks 16 produced by the response marker 15 is passed back to a mark analyzer 17, preferably part of the node module 2. This reduces the set of marks to a set of statistics 18, for example, just a single percentage mark, derived from the set of marks as a whole. Preferably the same sort of statistic or statistics are generated for each node.

Clearly if the set of marks 16 consists of only a single mark then no processing may be required. In this case it may still be necessary, however, for the mark analyzer to perform some data translation. For example, the mark 16 may be simply a flag indicating a correct or incorrect response when the statistic 18 is a percentage mark. In such a case "correct" may be converted to 100% and "incorrect" to 0%. The mark analyzer may be constructed to convert more than one sort of mark, or set marks, into the same type of statistic or set of statistics.

The last stage of response analysis is preferably to produce a set of success and/or navigation flags 19 by a success/navigation calculator 20. The function of the success/navigation calculator is to control the user's access to nodes and hence the related activity modules which, of course, includes related encyclopaedia entries. This, it does on the basis of the mark statistics 18 and navigation rules, examples of which are described below. As an aid to this process the success and navigation calculator may keep flags indicating whether the skill associated with the node has been obtained by the user, it may keep flags indicating whether a node is to be accessible to the user, and it may keep flags indicting both of those things.

The success/navigation calculator 20 decides, at a relevant time as discussed below, whether or not the mark statistics 18, if indeed the student has yet attempted the node's associated activity module, justify the conclusion that the student has attained the node's skill. The criterion used is one appropriate to the skill. For example, in safety critical subjects and in learning a foreign language 100% correct responses may be demanded whereas in school subjects perhaps only 50% may be required (having subtracted a response rate that would be expected from random responses). The system may be arranged such that a common criterion may be used for all nodes of a network and that criterion, or even each of separate criteria for each node, may be set for a particular student.

An example of the rules implemented by the success/navigation calculator 20 and of the flags kept 19 is as follows.

A four state flag, or status variable, is kept being an integer variable assigned one of four arbitrary values being for example, 0, 1, 10 and 100. 1 is the default state of the flag of a node before the user has been tested on that node's skill (or before the user has been tested at some other node which may affect the value of the flag, as is described below). 0 indicates success, i.e. that the user has attained the node's skill. 10 and 100 both indicate, in general, failure, i.e., where the node's skill has been tested but was not attained. 100 is the normal value assigned for failure but 10 is assigned where it is desired to allow access to the user nevertheless. In this example 10 is assigned to failed root nodes, root nodes being ones to which there are no easier nodes connected, for example, node 21 in FIG. 1. Other nodes for which failure may result in a value of 10 may also be specified by the designer of a network.

The success/navigation calculator calculates an accessibility flag for a node as follows. The accessibility flag is set to "accessible" unless an easier node connected to that node, either directly or on any path to any root node, is set to 10 or 100 (i.e. >1 in the scheme of values set out above), which occurs in general if any of those nodes have been failed. In those cases, the flag is set to "barred". The accessibility flag for a node is also always set to "barred" if the success flag of that node itself is 100. The accessibility flag is not set to "barred" for nodes having a success flag value of 10 and that is irrespective of whether easier nodes have been failed (which is of course irrelevant for root nodes).

In this way, the more difficult nodes beyond a failed node are made inaccessible to a user making sure that he or she does not attempt a task where failure is probable. For an ordinary failed node, i.e. one set to 100, that node itself is inaccessible and so the user is forced to try something easier.

In order to allow the user to progress to a previously failed node certain success/navigation flags having the value 100 are altered to 10 on the occasion of the user passing the test of a particular easier node. Preferably, that occurs for the more difficult node or nodes directly connected to a just passed node.

Alternatively that may occur for those nodes within a certain plural number of nodes beyond the just passed node. This is suitable for networks having nodes of numerous finely graded levels of difficulty and speeds the student's progress through the network, but care should be taken to ensure that a student is not led to nodes for which he is missing some essential skill.

Always setting a failed root node to 10 ensures that at least that node is always accessible.

An administration module may be provided having a function allowing, for example, a user's teacher to set at his or her discretion the success flag of a particular failed node to the value of 10 to allow the user to attempt the failed activity module again.

The 10 flag lets the system discriminate between nodes which have been truly passed and those which have been made accessible other than by the user's performance.

In an alternative embodiment nodes may simply be marked as passed or failed and access to a node is denied if the node itself or an easier linked node, directly or via other nodes, has been failed. To allow progress failed nodes are marked as passed after a period of time has elapsed.

In another embodiment a failed node is not inaccessible merely by reason of it having been failed itself but will be inaccessible if an easier connected node has been failed. This allows a student to repeat a failed node until he or she attains the node's skill.

In another embodiment access is initially denied to all but a root node or nodes. Access to further nodes is allowed only once a linked easier node has been passed.

In still another embodiment a longer history of the success or failure may be built into the success/navigation flags kept. For example, a value may be incremented each time a node is passed and is decremented each time it is failed, the node becoming inaccessible if that value falls below a certain level. An accessible node is, for example, made accessible by automatically incrementing the value, preferably by a smaller amount, from time to time.

Figure 3:
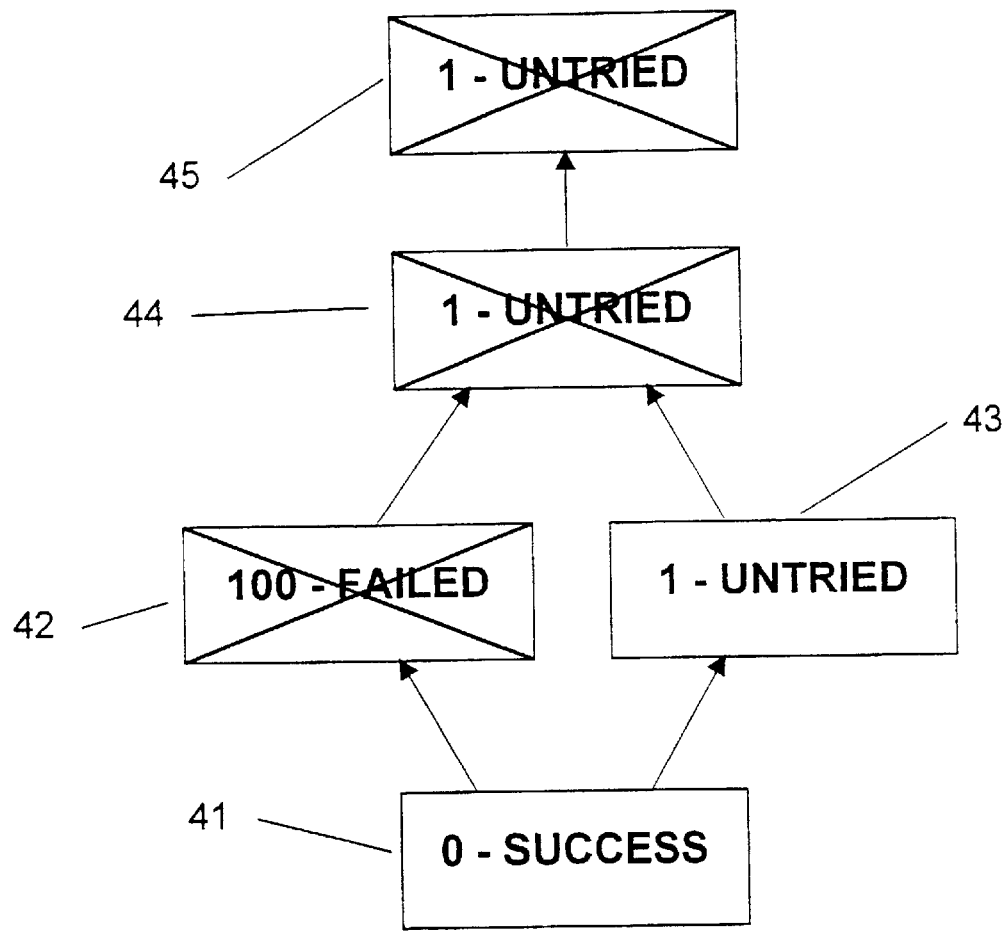
FIG. 3 is an exemplary network illustrating the operation of the accessibility module of the present invention.

Preferably in both the preferred and other embodiments described above a node is inaccessible, and is marked appropriately for that, even if on only one of several paths back to a root node, or nodes, there is a node that is marked as failed. FIG. 3 is an exemplary network with nodes 41 to 45 marked with the values of their success/navigation flags for the scheme described above in which the flags have the value 0, 1, 10 or 100; they are also marked with a cross if they are inaccessible to the user. In this example the user has passed the root node 41 but has failed node 42 one of the two nodes 42 and 43 immediately connected to the root node failed node 41. Nodes 44 and 45 are inaccessible even though there are paths from those nodes to the root nodes 41 via node 43.

In an alternative embodiment, if there are plural routes to a root node, or indeed to root nodes if there is more than one, from a particular node then that node is only inaccessible if all routes to a root node are blocked by a failed node (i.e. having a success/navigation flag of 10 or 100 in the scheme described above).

The system may be used with more than one developmental network, each represented by node objects. For example, in addition to the simple arithmetic network of FIG. 1 the system may include a set of networks for literacy including networks for reading, spelling and handwriting. In general these networks will have associated with them their own activities. The system allows, however, for activities that test skills in two different networks. For example, an activity may present and test material relating both to the operation of adding two to a number and the ability to spell the word "two". Such joint presentations are to the interest of the student. The system may be set either to record the student response statistics generated in relevant nodes of the relevant networks or to record only the statistics relating to the network in which the student thinks he is working because, for example, he reached the activity by choosing to do something about arithmetic. The manner of selecting an activity is explained below). The setting may be one related to the student set by him or not or his or her teacher or may be one specific to the activity.

The system may allow for an activity to test at the same time more than one skill in the same network.

The system is flexible in that it may be provided with a database of networks and activities for any area of learning, and new networks and associated activities may be added at a later date.

In each of the embodiments described the accessibility rules are applied by an accessibility module of the system which traverses the networks loaded into the system examining the success/accessibility flags to determine which nodes are accessible to the student. This module makes the list of accessible nodes available to one of several interfaces described below. The system of the present invention may be configured to include any combination of these interfaces and the interface used by a student may be at his or her choice unless specified by his or her teacher in the administration module.

Examples of suitable interfaces are described below.

A first interface is a module providing a series of hierarchical menus. As has been mentioned above the system may be loaded with a number of networks and associated activity modules. Each of these networks also contains information about how these networks may sensibly be classified. For example, the subject of mathematics may be divided into arithmetic, geometry, calculus, vector analysis and so on. Each of these subjects may be divided into topics. For example, geometry may be divided into two-dimensional geometry, three dimensional geometry, projection geometry, topology and so on. These topics may be further divided until the area of study is of a size suitable to be represented by a developemental network, which size will depend on the subject matter, the age and developmental level of the intended student and also on the network designer's discretion. For example, a network for a higher developmental level than the basic arithmetic of FIG. 1 may include negative and fractional numbers. The information about the grouping is gathered by this interface module and is organised to the series of menus. On the first menu are the broad subjects such as mathematics, English, history. Selecting one of these items leads the student to the next level and so on until the entry for one network is selected.

The system may then display a list of only the accessible nodes. Clicking on an item on the list for a node causes a list of its related activity modules (including encyclopaedia entries) to be displayed. Clicking on an item of that list causes its related activity module to be activated. If the node has only a single activity module associated it is activated automatically without a list of activity modules being displayed. The menus also include links to items in an electronic encyclopaedia referenced by the accessible nodes.

On the higher level menus no item is displayed unless it leads to an accessible node.

Alternatively the system may be arranged to select for the user an activity module from among those available to the student. This reduces the number of choice to be made and so is less boring. This is the preferred arrangement for the primary school level and for the teaching of a language.

A second interface module is a search engine which allows the student to enter keywords which are searched for against key words supplied for the purpose at each node. The search engine returns to the student links for only those nodes that have those key words and that are accessible as determined by the accessibility module. On selecting one of those links the appropriate activity module is activated. For an encyclopaedia entry key words include at least the headword for the entry. Activity modules may be categorised by other criteria and the search engine may be arranged to allow the user to search accordingly.

In one example, keyword are divided into two classes. One corresponds to keywords of bibliography and everyday life, the body, school, history, and so on. The other is a set of about thirty categories, all commonly encoded in grammar. Examples include animacy, volition, humanity, social status, reference to time, reference to spatial relations between the speaker, the addressee and a given object. Like any other keywords they can be taken as largely independent Boolean filters. They can be represented abstractly by appropriate multimedia devices such as positions in a grid, defined by colour displayed on a palette. They can be added to each other and the standard keywords. The difference is that one set is narrowly finite while the other is not. The availability of a narrowly finite set of keywords each. This provides a small set of keywords and faster searching than by bibliographic keywords alone.

For any given item in the lexicon, a link may be provided to any other item. This link may have any one or more of a small set of Boolean characters. These include the property of conditionality, the fact that the arm is part of the body, the hand is part of the arm, and so on, the property of categorical relationship, the fact that a chimpanzee is a sort of ape, which is a sort of primate, and so on. The property of antimony, relating black and white, and any of the recognised lexical properties of relationship including etymological or productive derivation. A link between words may exist without any of these conditions being satisfied.

Activity modules may be characterized by other criteria and the search engine may be arranged to allow the user to search accordingly. Entries may be categorised by sytactic category, noun, verb and so on, by spelling, by sound, taking account of either or both the beginning and the end of the word, by length in terms of numbers of syllables, by morphological regularity, or by frequency of use.

The system is usually used For the purpose teaching a student. The keyword interface is also usefull for the allowing the student to find the answer to a specific question that he or she may have. In such a use the access preventing means of the invention will still operate to limit the information available to the student to that for which he or she has the relevant skills.

A third interface is a more directive suggestion module. If a activated by the student then a list of accessible modules is presented to the student. This list is, however, sorted in the following order:
1. Nodes close by in the network to the last attempted node.
2. The remaining nodes in that network.
3. Nodes of related networks, those being more closely related according to the subject hierarchy mentioned above being listed first.

A fourth interface module is provides a graphical means of selecting a network. Other means such as the fifth and sixth interface modules described later may be used for selecting a node within the selected network. Using the fourth interface module a network may be selected in one or two ways. A display is provided representing a transparent lift on the outsize of a building. By pressing up or down lift buttons the lift moves to a new window on the building, each window containing an illustration or text identifying a particular network, for example a network for spelling. The user activates that network simply by clicking on it with the mouse. The lift may also be operated by pressing buttons marked with the names of general subject groupings of networks. If one of those buttons is pressed the lift moves and the doors open onto a corridor having doors bearing a graphic or text identifying an individual network, which again the student may activate by clicking. For example if in the lift the student clicks the literacy button he or she may be taken to a corridor having doors for spelling, handwriting and reading. If the subject heirachy needs to be deeper a door may be arranged to lead to a further corridor having doors for individual networks or possibly smaller groupings of networks. This interface is of general applicability in that it may be loaded with windows and doors for nay combination of networks loaded into the system. This is of advantage to the user as it provides a consistent easy to use interface. This is in contrast to arranging or individual multimedia graphics for each group of subjects.

In a preferred embodiment the success/navigation flags 19 (see FIG. 2) are calculated immediately on completion of an activity module and advantageously are stored permanently so that the student may at a later date return to the system in the same condition as he or she left it at the end of a session. Th student's responses 13, the marks 16 or the mark statistics 13 or some combination of those may, however, be permanently recorded, either instead of or in addition to, the success navigation flags 19. (The stored data may be reviewed by the student's teacher at a later date.) Recording of student's responses 13, the marks 16 or the mark statistics 13 also allows the success/navigation flags 19 to be recalculated by the success/navigation calculator 20 if the level of success required is changed by the student's teacher as is allowed by the administration module. The teacher wound make such an adjustment in the light of the experience of his or her students progress through a network. Conceivably operation of the response marker 15 or the mark analyser 17 could be changed after a student had used the system and if that is to be permitted, the system is preferably configured to store the student responses 13 or the marks if in order to allow recalculation of the success/navigation flags 19 once the system has been updated.

As foreshadowed above, a developmental network may be generated automatically. The details of how this may be done will differ with the subject matter of a network but in general the progress is, in a preferred embodiment, in two stages. First a list of the individual skill for which the network is to have nodes is generated and then those skills are sorted or ranked into a network according to some rules about the relative difficulty of the skills. Such a set of rules is termed herein as the "developmental criteria" for a network.

A network is comprised of nodes. A node may be defined by the point at which two criteria interact. Fort example, in relation to primary arithmetic, if one criterion consists in the size of the inputs and another consists in the nature of the operation, the operation 1÷1 instantiates the lowest logically possible interaction between these criteria. These and other criteria are defined below.

As has been described above nodes have the property that dominate one or more other nodes, or are dominated by other nodes, or both dominate and are dominated by other nodes, i.e. they are ordered into easier and more difficult nodes. Each node may be assigned a unique identifier. A given node n is defined by its relations of dominance to other nodes within a given network. Indirect relations of dominance are computed by progressively searching for these relations. For the set of nodes dominated by n, let us say N', one step of this searching is for the set of nodes dominated by the members of N', and so on.

A network reflects "developmental implications"; to the effect that of the user can do X, the user can do Y. In an absolute and non-arbitrary way these relations are between to or more skills in an academic subject area, such as mathematics, literacy or a foreign language. These relations are commonly reflected in the spelling of words different levels of different orthographic or phonological complexity, or, in the case of arithmetic between the steps of a table. Performance in relation to a given task can be taken as evidence in relation to one or more of these implicational relations.

FIG. 1 shows the effect of a small part of a network relating to the four arithmetical operations subject to certain restrictions, as discussed below. The implications in FIG. 1 are all consistent. Each operation between two inputs represents a node, at which the user can achieve success at particular level of development. A node indicated by an arrow head implies or dominates the node at the tail of the arrow. The length of the arrows and relative height within the network are irrelevant. There is no restriction on branchedness or the crossing of arrows. The only relation is by the head to tail arrangement of arrows.

FIG. 1 shows the lowermost nodes of a network defined by the interaction of implicational, or developmental, criteria concerning the operation and the size of the operands. The restrictions are: A) that the output is a positive integer (excluding computations where the output is a fraction or negative); and B) that the output is distinct from the larger of the inputs. This Network is designed to reflect both the extent to which division is harder than addition and the idea that 1+1 is the simplest operation and that 2+2 is the simplest multiplication.

A more general set of criteria is defined below generally what is taught in Britain today as primary arithmetic.

1) Given two cases of the same operation involving an integer i and one other input, and an output j, the ranking of the two operations is directly and positively related to the value of or j, whichever is the greater; the higher this value, the higher the ranking and the harder the calculation.

2) Addition ranks lower than subtraction and multiplication. Division ranks higher than subtraction and multiplication. (Nothing is specified about the relative ranking of subtraction and multiplication in relation to each other.) The case where either of the inputs or the output is not a positive integer ranks higher than the case where this condition does no hold and higher than the case of a given corresponding operation of division or subtraction. (Fractions and negative numbers are harder than whole numbers and positive numbers respectively. And at least one degree of skill in relation to the appropriate non-commutative operation as implied by any ability to manipulate a fraction or negative number.) An operation where the output is a negative number or reciprocal (one divided by an integer) is ranked in direct proportion to the differences between the output and the integer, one.

3) The case where the output is distinct from the larger of the inputs alternatively, where a multiplicand or divisor is not 1) ranks lower than the case where this condition does not hold; operations which are trivial in their effects are more difficult than those which are not.

4) The involvement of place-holding in the operation ranks higher than the case where it is not involved, where the effect is proportional to the number of place-holders involved; the operation in 9−3 is easier than the operation in 9+3. A computation where 10 is either the output or one of the inputs is more difficult than a computation where the 10 is replaced by 9.

5) Given two instances of multiplication or division operation both involving a common value c, differing in that one involves a base with the factors i and j, while the other involves the prime k, such that k is greater than i or j, the latter operation implies the former; the 7 times table is more difficult than either the 8 times table or the 9 times table.

6) The involvement of zero as an input implies at least one operation involving integers alone.

The above criteria favour simple, non-trivial operations with positive, integral outputs of the smallest size, where the representation does not involve place-holding. On the most highly favoured value of all the criteria above, only one operation is possible, namely 1+1. The inference module of the system applies in respect of all the user's test responses in relation to a given set or networks. Test responses can be grouped into sets of any size. In respect of a foreign language these may consist in a single word. Where a test response has more than a single element or keystroke, the evaluation proceeds by scanning it in both directions. It is thus determinable as correct or incorrect in any of a number of ways which can be ranked and analysed by appropriate rules. Errors can be categorised and flagged according to whether they are likely to involve a misunderstanding of the spelling, the grammar, and so on. In preferred embodiment for younger users the sets are likely to be be between 4 and 8 in size. For older users this may be one, as in he case of some aspects of foreign language learning, or it may be a larger number such as 100. For any size of set, the evaluation has a statistical element, as mentioned above.

In default the system knows nothing about the user. Accordingly the system may be arranged to cycle through a set of conditions under which one or more of the criteria may be reversed in favour of some selection other than the easiest. In relation to arithmetic, by one such reversal, the size of the operands may be disregarded within given limits. If this is three digits the system may then offer the user a sample of additions involving three digit numbers, necessarily also reversing the criterion involving placeholding. By another such reversal, the criterion regarding place holding may be reversed so as to offer the user a set of activities differing marginally in whether place holding is involved. For any response or set of responses, by one possible extrapolation, it is assumed that if the user responds correctly to a task defined on a given basis he or she can respond correctly any such task. Taking the case where the user is given two randomly selected numbers to add, if the user does so correctly the system infers that the user can add any two numbers. The system then generates a random sequence or such tasks. If the user performs to a given predetermined standard, getting the answer right in such and such a proportion or number of cases, the system automatically resets another default, offering multiplications or subtractions with numbers within the same range. The time to complete a preliminary automatic assessment of an unknown user can be lessened by adopting the principle that the less the system knows about the user the smaller should be the amount of positive evidence necessary before a criterion is reset from a default or easier case. At any point where the user starts to fail (at least to a degree such that performance is treated as falling below a given standard) each case of failure (and each element in cases where the response is internally complex) is evaluated by all relevant criteria, namely those which refer to the task in any way. Let us suppose that the user fails to give a correct answer to the question: 'What is 97 divided by 13?' Without taking account of the nature of the error, i.e. in the simplest case, the error may be due to the operation itself, the size of the elements, to the place-holding, to the fact that the correct answer is not a single positive integer or any combination of these. By the simplest implementation single explanations of an error are considered in turn. Accordingly, by the task generation module a series of activities may be generated such that these hypotheses can be tested automatically by the system one at a time. By the first such system test one of the numbers ant one other is submitted to another operation. By the second an operation of division is offered with a similar pair of numbers where the output is a positive integer, and so on. In five or so steps, the system can accomplish this part of the assessment. By applying the same principle on-goingly, by generating tasks randomly within a given set of limits which may be adjusted up or down by the user's performance, the user's current working area can be rapidly adjusted to an appropriate area within one or more networks. This is equivalent to a position in a traditionally implemented paper-based course. But it takes account of the user in a much more detailed and accurate way.

On some values on some criteria, two operations involving the same operator and the same inputs may be ranked one way on one criterion and a different way on another. By 1), the operation in 9−3 is more difficult than 8−2. By 4), this relation is reversed. The user, attempting to carry out the operation in 8+2, is not privy to the mind of the system designer. By the same token the mere fact that the user makes an error does not mean that the task was impossible; the fact of the error is just evidence pointing in a certain direction. A failure with respect to such an operation may be conditioned by either the value factors in 1) or the representational factor in 4). Accordingly this invention is preferably equipped with a series of inference rules which carry out an on-line analysis on whatever data is available. This provides an approximate estimate of an actual level of intellectual function.

The ranking of two arithmetic operations is commonly, but not always, exclusive. According to the way criteria interact there may be two inverse rankings of two operations differing by only one factor, for example 9+3 and 9−3. Intuitively this corresponds to human variation. In the same way, for some individuals the reversibility of mathematical operations is obvious. The subtraction in 2−1 is simply the inversion of 2+1 under the condition that the input are treated as non-commutative. For others this is less obvious. The reversibility is expressed by the arrow from 2+1 to 2−1 in FIG. 1.

Some logically possible interactions generate inconsistencies in more complex cases where the output is not a positive integer. On these criteria the fractions in $1\frac{2}{3}$, $\frac{2}{3}$, $\frac{27}{64}$, are ranked in this order of difficulty. But the role of the prime 7 in the numerator or the denominator, in in $\frac{1}{7}$, $\frac{1}{14}$, $\frac{7}{8}$, $\frac{7}{16}$, $\frac{7}{144}$, may contribute differently to the ranking for different individuals. The differences between 'zig-zag' and more vertically upwards paths through a network like that in FIG. 1, express the possibility of variation across individuals in what they find difficult.

It should be noted that a failure with respect to a test item does not denote that the item in question is impossible for the user. Such a failure is just evidence of the fact that it may be.

The separation between networks each defined as a logically possible interaction between criteria permits a large number of different, but logically well-defined developmental paths. For different users different concepts may be more difficult and so from time to time different users wall find it easier to progress through one of the networks than the other. This allows a user to find his or her path through the concepts of a particular area of learning in an efficient manner.

Educationally it may seem pedantic to ask whether learners should, for example, start rehearsing subtraction with single digits only when they can add pairs of digits within a certain range, or when they can add single digits with a particular degree of confidence and accuracy, and so on. But previously where educational materials were presented in strict linearity—as in a book—a decision on such points is forced. Allowing multiple networks for the same area of learning allows the possibility that there may be some variation between individuals on such points.

The intention here is not to suggest that the sets of developmental criteria for basic arithmetic set out above are definitive. The definition of networks in terms of formal criteria, rather than simply defining them node by node, is intended to allow and indeed encourage the progressive development of the invention as an educational tool. In the light of experimentation, any given implicational criterion can be amended. It may for instance, be appropriate to amend or redefine the criterion 6) above, an explicit hypothesis, in the light of experience. Further criteria may also be provided for related subject matter of greater or lesser difficulty. For example, criteria may be provided for numeracy defining exponents or logarithms.

Networks of different difficulty may nevertheless share developmental criteria. For example, an easier network than that of FIG. 1, is for performing arithmetic as a concrete operation, e.g. by moving groups of objects about the display. In such a network multiplication may still be considered more difficult than addition for example.

Networks of different difficulty may have recorded in their representations links to each other. The interface by which a student chooses his or her next activity module may use that information to allow the user to move to a harder and easier networks than the one he or she is presently using. These links may organise the networks themselves into a network, and restrictions may be placed on the student's movement between networks, for example, by using similar rules to those outlined for restricting access within a network as described above. For that an appropriate criterion of success may be that a certain proportion of all the nodes have been passed, or a least not failed, or that the a proportion or all of the leaf nodes (those to which no more difficult node is linked) have been passed or not failed. Further the representation of a network may also record suitable nodes at which the user could start depending whether he or she has come from a harder or an easier network. Preferably the user is directed to a root node when moving to a harder network and to a node some distance above a root node when moving to an easier network, If information is available in the system as to the developmental criteria used to define a network, a fifth interface module to be described below may be used with the system, and indeed it is the preferred interface for reasons that will become apparent. The information may be available either because it is recorded in the representation of each node how the developmental criteria come into effect for that node, which may be arranged irrespective of whether the network was generated automatically or was designed manually. It is also possible for the module for generating a network automatically, if indeed that is being used, to be arranged to generate the information as needed.

The fifth and preferred interface module deals primarily with the current settings of any defaults as entertained by the apparatus in relation to a particular network. The network itself my be selected by any appropriate means described above. In default, the system cycles within an area defined by a set of nodes, i.e. it automatically presents the user with activity modules in turn without the user having to choose his or herself. This area may be less than one defined by the set of nodes from which the user has not been debarred. Essentially this corresponds to the notion of work of a given degree of difficulty where the difficulty fluctuates within a finite range. Given such a set of nodes N around which the system is currently cycling, there is a set of more difficult nodes N' immediately dominating one or more members of N, such that access is not debarred by virtue of the evidence of the user's performance. In the preferred embodiment the interface directs the user to a member of N' selected randomly or otherwise.

Figure 4:
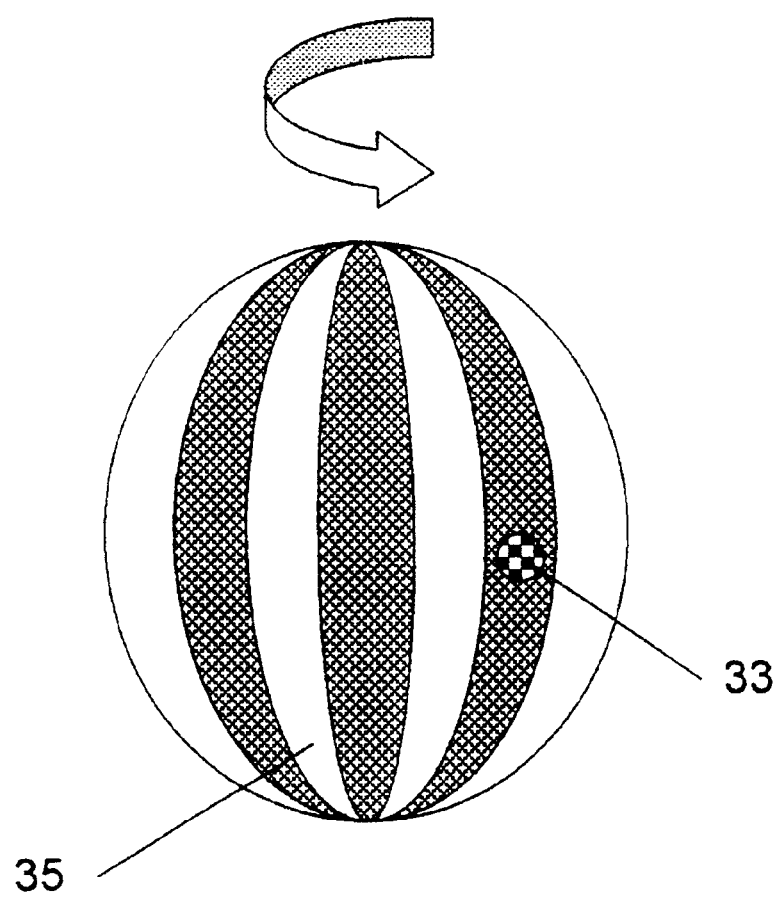
FIG. 4 is an example of a graphic interface for allowing a user to select a node in a developmental network.

In this interface the user fires a small red ball which arches in a long trajectory towards a larger striped ball 35 of the sort illustrated in FIG. 4 on which a black ball 33 the same size as the red ball is attached in the middle of one panel exactly on the equator. The red ball knocks the black ball off position, attaching itself in the same position. The striped ball is spinning and within a small number of rotations, each lasting less than a second, the red ball has itself become black and the process can be repeated. The position and size of the target, and the size and colour of the artillery might be varied randomly. Such variation would greatly enhance the interface. The black ball represents a member of N'. In response to the activity of firing the ball the system redirects the user to an activity module for one of the nodes of N' and redefines the sets n and N' accordingly. Under the condition defined above, where there is no such member for a particular user at a particular time, for instance where only one or more root nodes are available to the user he ball graphic may be unavailable. In the case of the user reaching the point where there are no higher ranked nodes other than any to which access may be prohibited by virtue of recorded failures, the apparatus may respond by not providing another red ball.

The ball graphic is a single instruction by he user to the system to make his or her tasks harder in one single respect on one criterion. This may be to progress from one step of place holding to two, or from the set of positive integers to include either fractions or negative numbers, and so on. Movement in the opposite direction is brought about by the access preventing means when the user fails a node.

The ball graphic is, of course just exemplary and the promotion of the user to more difficult tasks may be in response to some other user input or indeed may be performed by the system, for example, on the evidence or user performance or at intervals of time.

In the preferred embodiment for all levels of use the user does not by default control which of the accessible nodes is being selected by the ball graphic. It is possible for the user to control the attachment of the ball to the target (in particular the stripe to which it attaches) and to know the academic significance of this. This effect an be achieved by displaying (at the user's option) the academic significance of a particular stripe when the mouse cursor is over that stripe. Using an appropriate tool the larger ball can be rotated one stride at a time. It is preferred for ease of use for the system to cycle within a small set of available nodes, one of which is randomly selected to be represented by the black ball.

To give the user, particularly the very young child, some control over transition between concrete and symbolic representation, a second tool applies to the graphic of the two balls. By this tool the larger ball can be raised or enlarged in some highly visible way. In some contexts, particular in primary school, this allows the user to determine to some degree whether his or her work should be in respect of multimedia objects or written words or numbers. This raising and enlargement may be reversible.

Essentially the interface is designed to maximise interest, surprise, and personal involvement, with a minimum of repetition and administration. In the current version of the system there is from one activity to another approximately four mouse clicks, each a natural response to the perceived difficulty of a task.

Without any intervention by the user the promotional effect or this module is carried out automatically on the basis of an inference to the effect that the user is ready for tasks of a more difficult sort. For this purpose, two constants may be assigned to a body of work, the number of items in a continuous series of trials and the proportion correct. As soon as this criterion is reached, one randomly selected default is automatically reset, equivalent to a firing of the red ball.

Through the action of the success/navigation calculator the user may find that his or her choice becomes restricted to the root node or even such that no nodes are available.

A directive suggestion module is automatically activated at this point guiding the user appropriately to the next node. The direction given is more subtle than for the directive suggestion module described above as the third interface. Nodes from networks defined on at least one of the same developmental criteria as the present network are located and preferably the user is guided to nodes having a similar or easier degree of difficulty on the shared criteria. Preferably the user is first guided to nodes in a linked easier network and then to nodes in other networks in the subject area.

In an embodiment for a subject area where the user's target is narrowly defined within small limits a sixth interface module displays the network as a graphic. That graphic may be of the moon. In contrast to the fifth interface module described above it does not make use of developmental criteria and so may be used in the absence of information about those. Once a particular network is selected the graphic appears directly representing the network and its nodes in a single display. When the graphic is complete there is for each node a region of the moon having a flashing spot within it. The links between nodes (i.e. those that have arrows in the representation of FIG. 1) are represented by the areas for those nodes being contiguous. The root node (in the case that there is exactly one) is represented by the lowermost edge of the moon. Regions for more difficult nodes branch off with the same structure as the network. Only accessible nodes are visible, however, and it is the student's goal to complete the graphic by attaining the skills for all the nodes. Initially this interface may only show the area for the root node. More difficult but accessible nodes may be added by the user by clicking a control on the screen. A hint of an inaccessible node may be given by having the area for that node appear briefly as the mouse pointer passes over it. Clicking on an accessible node leads to the activation of the corresponding activity module. If the set of accessible nodes is restricted because the user has failed a node then the graphic is reduced accordingly.

A further aspect of activity module selection, as follows, may be included in the system. A set of activity modules may be developed along some theme, for example, a highly graphical set, or a set using a traditional text based approach. If activity modules of two or more such types are provided for the same network then the user may be allowed to choose among them each time he or she selects a node. Alternatively the user may choose using a general administration module which sort of activity he or she would like to use, with that choice being applied automatically on each subsequent node selection.

Another function of the administration module may be to allow the user to specify what level of confirmation or feedback he requires for the inputs he or she makes with the keyboard or mouse.

The present invention may be implemented on a general purpose computer such as a personal computer (PC).

The same basic system may be used in may areas of education from the primary school to industrial training; the system simply has to be loaded with developmental networks and associated activity modules for the subject to be taught.

The basic system may also include library routines for use by the node and activity modules. For the activity modules it may provide multimedia presentation routines, audio playback and recording facilities and routines for recording the student responses in a central store. For the node modules it may provide library routines for storing the response statistics and success/navigation flags in a central store and also or calculating the success/navigation flags from the response statistics.

The system may also be implemented as an independent unit and that may be in the form of what is known generally as a console. Such a unit may accept cartridges holding at least one developmental network and associated activity modules. Such a unit may also accept cartridges for recording a particular students progress so that he or she may carry that information form one console to another.

The user of the computer assisted learning system may not be a person but an artificial learning heuristic system, for example a suitably programmed computer. The interface between such a system and the system of the present invention may be electronic for abstract skills, may be mechanical if the artificial system is for performing some mechanical task, and may be aural or visual if the artificial system is for performing some aural or visual task. While an artificial system may not suffer the problems of frustration, boredom or disappointment that the system of the present invention seeks to avoid or relieve, the use of the present system may result in she more efficient programming of an artificial learning system since time is not wasted on skills that the artificial system has no hope of performing at a particular point of its training. If an artificial system is to be so trained then it is necessary for selection among the permitted activities to be performed by a module, which may be provided as part of the present invention or as part of the artificial system, or by a human operator. The strategy for selecting the next of the permitted activities to performed may be a random one. It may be instructive to compare the efficiency with which a particular artificial system becomes educated with different strategies.

The system allows different users to be more or less thorough in the way they exploit the flexibility of he network. Slow learning users will need to exploit that system more thoroughly than relatively fast-learning users. The system is flexible in the sense of system development. It can be provided with a database of networks and activities for any area of learning. New networks and associated activities may be added at a later date.

In an embodiment for individual use by adults the administration module may be configured to be relatively more accessible to the user than in an embodiment for a primary school classroom. In such an embodiment facilities may be provided for the creation by the user of additional networks. This in effect allows the user to become the network designer.

The system seeks to learn what the user is capable of learning in relation to a particular subject area and to constantly revise its own estimate. While this estimate is always approximate, it achieves an increasingly close approximation over time.

In all implementations a distinction may be drawn between research activities determined by the user and didactic activities determined by the system, as provided by the system designer. This distinction is more evident in an implementation intended for an adult or A-level student, particularly where the system is applied to the learning of a foreign language. Whatever the balance between teaching and a research facility in the design of a particular implementation, the user is formally evaluated with respect to the materials provided. This evaluation entails reference to the principle of the network. Where the system is used to teach the user rather than as a facility for his or her research, activities may be either generated on-line or called up from a hard-coded data-base. These activities may be initially presented with the answer, i.e. as a rote memory task, or with no answer, i.e. as problems.

What is claimed is:

1. A computer assisted learning apparatus comprising:

a database having at least one developmental network, the network having a plurality of nodes, each node representing a developmental skill or an inference concerning such a skill, and links between nodes, each link being between a node for a first skill and a node for a second easier skill, the links providing alternate paths between the nodes, the database further comprising interactive activity modules associated with the nodes, means for allowing an interactive activity module defined in the database to be chosen by a user, means for presenting a selected activity module defined in the database to the user whether visually, audibly or otherwise, means for allowing the user to interact with an activity so presented, means for recording at least some of the user's actions during or responses to the presented activity, and means for evaluating at least some of those recorded actions or responses to decide, or provide an inference as to, whether the user has attained a skill associated with a node, and access prevention means operative in respect of at least a particular node of a network at least for some of the time, for preventing the user from choosing an activity module associated with that particular node according to some criterion based, at least in part, on the results of said evaluation for at least one activity module associated with at least one node of said network, said access prevention means is arranged to prevent access to nodes for which the user has attempted an associated activity module but has not attained the skill that the node represents, said access prevention means allows, after a period, access to a node for which an associated activity module has been attempted but for which the skill that the node represents has not been attained, and said access prevention means allows access to a node via one of the links for which the user has attempted an associated activity module but has not attained the skill that the node represents once the user has subsequently attained the skill for an easier node that is connected to that node via a certain number of links, each in the direction of a node for a harder skill to one for an easier skill.

2. Apparatus as claimed in claim 1 wherein said criterion is based, at least in part, on the results of the said evaluation for at least one activity module associated with at least one node for an easier skill connected to the particular node either by a single said link or by more than one of said links, each of those links being in the direction of a harder skill to an easier skill.

3. Apparatus according to claim 1 wherein the means for presenting an activity module is capable of passing to an activity module arguments associated with a particular one of a plurality of nodes associated with that activity module, those arguments defining or adding to a definition of the skill represented by the node.

4. Apparatus as claimed in claim 1 and further including means for presenting an activity module for at least one item in an electronic encyclopaedia.

5. Apparatus as claimed in claim 1 and further including means for allowing a user to record an audio track of their own voice, for storing that track in association with a node and for allowing the user to replay that track.

6. Apparatus as claimed in claim 1 wherein the means for recording responses includes an on screen keyboard.

7. Apparatus as claimed in claim 1 wherein the means for evaluating the recorded responses or actions comprises a means for marking the recorded responses and for providing corresponding marks.

8. Apparatus as claimed in claim 7 wherein the evaluating means comprises means for reducing the marks provided by the means for marking to one or more statistics.

9. Apparatus as claimed in claim 1 wherein the evaluating means generates at least one flag indicating whether the skill represented by a node has been attained by a user and whether the node is accessible to the user.

10. Apparatus as claimed in claim 9 wherein said at least one flag or value indicates, from time to time, the following conditions: that the user has not attempted an activity module associated with the node, that the user has attempted an activity module associated with the node but has not attained the skill tat the node represented, and that the user has attained the skill that the node represents.

11. Apparatus as claimed in claim 9 wherein said at least one flag indicates, from time to time, the following condition: that the node is to be accessible to the user irrespective of whether the user has attempted an associated activity module or has attained the skill that the node represents.

12. Apparatus as claimed in claim 1, wherein the certain number of links is one.

13. Apparatus as claim in claim 1, wherein said period is a predetermined period of time.

14. Apparatus as claimed in claim 1 wherein said access prevention means is arranged not to prevent access to a node merely for the reason that the user has attempted an activity module associated with that node but has not attained the skill that that node represents.

15. Apparatus as claimed in claim 1 wherein the said means for preventing access always allows access to a root node.

16. Apparatus as claimed in claim 1 wherein the means for preventing access does not prevent access to a node elected by a user to be accessible.

17. Apparatus as claimed in claim 1 wherein said criterion is based on which of the routes from a particular node to a root node has a node for which the user has attempted an easier skill but has not attained that skill, the links making up said routes always being in the direction of a harder skill to an easier skill.

18. Apparatus as claimed in claim 17 wherein the access prevention means is arranged to prevent access to an activity module associated with a node if on the only such route or anyone of such routes there is such a said node.

19. Apparatus as claimed in claim 17 wherein the access prevention means is arranged to prevent access to an activity module associated with a node if on the only such route or on all of such routes there is such a said node.

20. Apparatus as claimed in claim 1 and further including means for presenting the activity modules allowed to a user by the preventing means into a hierarchical system of menus for presentation to the user.

21. Apparatus as claimed in claim 20 wherein at least some of the items on at least one of said menus is presented graphically.

22. Apparatus as claimed in claim 1 and further including means for displaying a graphic having a layout corresponding to the interconnection of the network and allowing the user to select among the activity modules associated with that network that are allowed to the user by the access prevention means.

23. Apparatus as claimed in claim 22 wherein the means for displaying a graphic hides portions of the graphic representing nodes inaccessible to the user.

24. Apparatus as claimed in claim 1 and further including means for presenting a list of activity modules accessible to the user with the activity modules for nodes in the same network as a node associated with the last activity module attempted by the user being presented first.

25. Apparatus as claimed in claim 1 and further including means for allowing the user to select from among encyclopaedia entries allowed to the user by the preventing means.

26. Apparatus as claimed in claim 1 including means operable with an activity module for which the evaluation means operates to decide whether the user has attained the skills of at least two different nodes.

27. Apparatus as claimed in claim 26 wherein the two said nodes are in the same network.

28. Apparatus as claimed in claim 26 wherein the two said nodes are in different networks.

29. Apparatus as claimed in claim 1 including means arranged to allow navigation between related networks, the representation of said networks including links for said navigation.

30. Apparatus as claimed in claim 29 including means arranged to place restrictions on the user's navigation between networks based on the results of the said evaluation for nodes of those networks.

31. Apparatus as claimed in claim 29 including means arranged to guide the user, when moving between one network and another linked to it, to a particular node in said latter network, the identity of that node being recorded in the representation of said networks.

32. A method for providing computer assisted learning comprising:

provifing a database having at least one developmental network, the network having a plurality of nodes, each node representing a developmental skill or an inference concerning such a skill, and links between nodes, each link being between a node for a first skill and a node for a second easier skill, the link providing alternate paths between the nodes, the database further including interactive activity modules associated with the nodes, allowing an interactive activity module defined in the database to be chosen by a user, presenting a selected activity module defined in the database to the user, allowing the user to interact with an activity so presented, recording at least some of the user's actions during or responses to the presented activity, evaluating at least some of those recorded actions to provide an indication as to whether the user has attained a skill associated with a node, preventing, for at least some period of time, the user from choosing an activity module associated with at least a particular node according to some criterion based, at least in part, on the results of the said evaluation for at least one activity module associated with at least one node of the said network, and allowing a user to enter at least one keyword and returning a list of activity modules that are associated with the keyword and that are not prohibited to the user by said access preventing.

33. The method as claimed in claim 32 wherein said criterion is based, at least in part, on the results of the said evaluation for at least one activity module associated with at least one node for an easier skill connected to the particular node either by a single said link or by more than one of said links, each of those links being in the direction of a harder skill to an easier skill.

34. The method according to claim 32 wherein presenting to the activity module includes passing to the activity module arguments associated with a particular one of a plurality of nodes associated with that activity module, those arguments defining or adding to a definition of the skill represented by the node.

35. The method according to claim 32 and further including:
presenting an activity module for at least one item in an electronic encyclopaedia.

36. The method as claimed in claim 32 and further allowing a user to record an audio track of their own voice, for storing that track in association with a node and for allowing the user to replay that track.

37. The method as claimed in claim 32 wherein recording responses includes recording those made to an on screen keyboard.

38. The method as claimed in claim 32 evaluating the recorded responses includes marking the recorded responses and providing corresponding marks.

39. The method as claimed in claim 38 wherein the evaluating comprises reducing the marks provided by said marking at least one statistic.

40. The method as claimed in claim 32 wherein evaluating includes producing at least one flag or value indicating whether the skill represented by a node has been attained by a user and whether the node is accessible to the user.

41. The method as claimed in claim 40 wherein the at least one flag indicates the following conditions: that the user has not attempted an activity module associated with the node, that the user has attempted an activity module associated with the node but has not attained the skill that the node represents, and that the user has attained the skill that the node represents.

42. The method as claimed in claim 40 wherein the at least one flag indicates the following condition: that the node is to be accessible to the user irrespective of whether the user has attempted an associated activity module or has attained the skill that the node represents.

43. The method as claimed in claim 32 wherein access preventing includes preventing access to nodes for which the user has attempted an associated activity module but has not attained the skill that the node represents.

44. The method as claimed in claim 43 wherein access preventing includes allowing, after a period, access to a node for which an associated activity module has been attempted but for which the skill that the node represents has not been attained.

45. The method as claimed in claim 44 wherein access preventing includes allowing access to a node for which the user has attempted an associated activity module but has not attained the skill that the node represents once the user has subsequently attained the skill for an easier node that is connected to that node via a certain number of links, each in the direction of a node for a harder skill to one for an easier skill.

46. The method as claimed in claim 45, wherein the certain number of links is one.

47. The method as claimed in claim 44, wherein the period is a predetermined period of time.

48. The method as claimed in claim 32 wherein access preventing includes not preventing access to a node merely for the reason that the user has attempted an activity module associated with that node but has not attained the skill that that node represents.

49. The method as claimed in claim 32 wherein preventing access always allows access to a root node.

50. The method as claimed in claim 32 wherein preventing access does not prevent access to a node elected by a user to be accessible.

51. The method as claimed in claim 32 wherein the criterion is based on which of the routes from a particular node to a root node has a node for which the user has attempted an easier skill but has not attained that skill, the links making up said routes always being in the direction of a harder skill to an easier skill.

52. The method as claimed in claim 51 wherein access preventing includes preventing access to an activity module associated with a node if on the only such route or anyone of such routes there is such a said node.

53. The method as claimed in claim 51 wherein access includes preventing access to an activity module associated with a node if on the only such route or on all of such routes there is such a said node.

54. The method as claimed in claim 32 and further including presenting the activity modules allowed to a user by said access preventing in a hierarchical system of menus.

55. The method as claimed in claim 54 wherein at least some of the items on at least one of the menus is presented graphically.

56. The method as claimed in claim 32 and further including displaying a graphic having a layout corresponding to the interconnection of the network and allowing the user to select among the activity modules associated with that network that are allowed to the user by said access preventing.

57. The method as claimed in claim 56 wherein displaying the graphic includes hiding portions of the graphic representing nodes inaccessible to the user.

58. The method as claimed in claim 32 and further including allowing the user to select from among encyclopaedia entries allowed to the user by said access preventing.

59. The method as claimed in claim 32 wherein evaluating includes deciding whether the user has attained the skills of at least two different nodes in response to said recording for an activity module.

60. The method as claimed in claim 59 wherein the two nodes are in the same network.

61. The method as claimed in claim 59 wherein the two nodes are in different networks.

62. The method as claimed in claim 32 including allowing navigation between related networks, the representation of said networks including links for that purpose.

63. The method as claimed in claim 62 and further including placing restrictions on the user's navigation between networks based on the results of the said evaluation for nodes of those networks.

64. The method as claimed in claim 62 and further including guiding the user, when moving between one network and another linked to it, to a particular node in said latter network, the identity of that node being recorded in the representation of said networks.

65. The method as claimed in claim 32 wherein said network is defined by a set of developmental criteria and wherein the representation of said network records those criteria and the degree of difficulty of individual nodes of the network with respect to those criteria, the method further including selecting, from the nodes the network allowed to the user by the access preventing, one or more nodes having a selected degree of difficulty with respect to the developmental criteria.

66. The method as claimed in claim 65 wherein the selected degree of difficulty with respect to a particular developmental criterion is a certain degree of difficulty and all possible greater degrees of difficulty with respect to that developmental criterion.

67. A computer assisted learning apparatus comprising:
a database having at least one developmental network, the network having a plurality of nodes, each representing a developmental skill or an inference concerning such a skill, and links between nodes, each link being between a node for a first skill and a node for a second easier skill, the links providing alternate paths between the nodes, the database further including interactive activity modules associated with the nodes,
means for allowing an interactive activity module defined in the database to be chosen by a user,
means for presenting a selected activity module defined in the database to the user,
means for allowing the user to interact with an activity so presented,
means for recording at least some of the user's actions during or responses to the presented activity,
means for evaluating at least some of those recorded actions to provide an indication as to whether the user has attained a skill associated with a node,
access preventing means, for at least some period of the time, for preventing the user from choosing an activity module associated with at least a particular node according to some criterion based, at least in part, on the results of the said evaluation for at least one activity module associated with at least one node of the said network, and
means for allowing the user to enter at least one keyword and returning a list of activity modules that are associated with the keyword and that are not prohibited to the user by said access preventing.

68. The apparatus of claim 67 wherein said criterion is based, at least in part, on the results of said evaluation for at least one activity module associated with at least one node for an easier skill connected to the particular node either by a single said link or by more than one of said links, each of those links being in the direction of a harder skill to an easier skill.

69. The apparatus of claim 67 wherein said means for presenting an activity module includes means for passing to the activity module arguments associated with a particular one of a plurality of nodes associated with that activity module, those arguments defining or adding to a definition of the skill represented by the node.

70. The apparatus of claim 67 and further including means for performing the step of presenting an activity module for at least one item in an electronic encyclopaedia.

71. The apparatus of claim 67 and further including means for allowing a user to record an audio track of their own voice, for storing that track in association with a node and for allowing the user to replay that track.

72. The apparatus of claim 71 wherein said access preventing means includes means for not preventing access to a node merely for the reason that the user has attempted an activity module associated with that node but has not attained the skill that that node represents.

73. The apparatus of claim 71 wherein said access preventing means always allows access to a root node.

74. The apparatus of claim 71 wherein said access preventing means does not prevent access to a node elected by a user to be accessible.

75. The apparatus of claim 71 wherein said criterion is based on which of the routes from a particular node to a root node has a node for which the user has attempted an easier skill but has not attained that skill, the links making up said routes always being in the direction of a harder skill to an easier skill.

76. The apparatus of claim 75 wherein said access preventing means includes preventing access to an activity module associated with a node if on the only such route or anyone of such routes there is such a said node.

77. The apparatus of claim 75 wherein the said access preventing means includes preventing access to an activity module associated with a node if on the only such route or on all of such routes there is such a said node.

78. The apparatus of claim 67 wherein the means for recording responses includes means for recording those made to an on screen keyboard.

79. The apparatus of claim 67 wherein the means for evaluating the recorded responses includes means for marking the recorded responses and providing corresponding marks.

80. The apparatus of claim 79 wherein the means for evaluating comprises means for reducing the marks provided by said marking to one or more statistics.

81. The apparatus of claim 67 wherein the means for evaluating includes means for producing at least one flag indicating whether the skill represented by a node has been attained by a user and whether the node is accessible to the user.

82. The apparatus of claim 81 wherein said at least one flag indicates the following conditions: that the user has not attempted an activity module associated with the node, that the user has attempted an activity module associated with the node but has not attained the skill that the node represents, and that the user has attained the skill that the node represents.

83. The apparatus of claim 81 wherein said at least one flag indicates the following condition: that the node is to be accessible to the user despite the user having attempted an activity module associated with the node but has not attained the skill that the node represents.

84. The apparatus of claim 67 wherein the said access preventing includes means for preventing access to nodes for which the user has attempted an associated activity module but has not attained the skill that the node represents.

85. The apparatus of claim 84 wherein said access preventing includes means for allowing, after a period, access to a node for which an associated activity module has been attempted but for which the skill that the node represents has not been attained.

86. The apparatus of claim 85 wherein said access preventing means includes means for allowing access to a node for which the user has attempted an associated activity module but has not attained the skill that the node represents once the user has subsequently attained the skill for an easier node that is connected to that node via a certain number of links, each in the direction of a node for a harder skill to one for an easier skill.

87. The apparatus of claim 85, wherein said period is a predetermined period of time.

88. The apparatus of claim 86, wherein the certain number of links is one.

89. The apparatus of claim 67 and further including means for presenting the activity modules allowed to a user by said access preventing means in a hierarchical system of menus.

90. The apparatus of claim 89 wherein at least some of the items on at least one of the said menus is presented graphically.

91. The apparatus of claim 67 and further including means for displaying a graphic having a layout corresponding to the interconnection of the network and allowing the user to select among the activity modules associated with that network that are allowed to the user by said access preventing means.

92. The apparatus of claim 91 wherein said means for displaying the graphic includes means for hiding portions of the graphic representing nodes inaccessible to the user.

93. The apparatus of claim 67 sand further including means for presenting a list of activity modules accessible to the user with the activity modules for nodes in the same network as a node associated with the last activity module attempted by the user being presented first.

94. The apparatus of claim 67 and further including means for allowing the user to select from among encyclopaedia entries allowed to the user by said access preventing means.

95. The apparatus of claim 67 operable with an activity module for which said evaluating means includes means for deciding whether the user has attained the skills of at least two different nodes.

96. The apparatus of claim 95 wherein the two said nodes are in the same network.

97. The apparatus of claim 95 wherein the two said nodes are in different networks.

98. The apparatus of claim 67 further including means for performing the step of allowing navigation between related networks, the representation of said networks including links for the navigation.

99. The apparatus of claim 98 and further including means for moving between one network and another linked to it, to a particular node in said latter network, the identity of that node being recorded in the representation of said networks.

100. The apparatus of claim 67 and further including means for placing restrictions on the user's navigation between networks based on the results of the said evaluation for nodes of those networks.

101. The apparatus of claim 67 wherein said network is defined by a set of developmental criteria and wherein the representation of said network records those criteria the program further including means for selecting, from the nodes in a network allowed to a user by said access preventing, one or more nodes having a selected degree of difficulty with respect to the developmental criteria.

102. The apparatus of claim 101 wherein said selected degree of difficulty with respect to a particular developmental criterion is a certain degree of difficulty and all possible greater degrees of difficulty with respect to that developmental criterion.

103. The apparatus of claim 101 wherein said selecting means includes means for offering the user a choice among group of nodes selected by said selecting only once the size of that group is below a certain size.

104. The apparatus of claim 103 wherein if said group of nodes is above said certain size said selecting means includes means for adjusting or allowing the user to adjust, the degrees of difficulty used to make said selection of nodes.

105. A computer assisted learning apparatus comprising:
a database having at least one developmental network, the network having a plurality of nodes, each representing a developmental skill or an inference concerning such a skill, and links between nodes, each link being between a node for a first skill and a node for a second easier skill, the links providing alternate paths between the nodes, the database further comprising interactive activity modules associated with the nodes,
means for allowing an interactive activity module defined in the database to be chosen by a user,
means for presenting a selected activity module defined in the database to the user whether visually, audibly or otherwise,
means for allowing the user to interact with an activity so presented,
means for recording at least some of the user's actions during or responses to the presented activity,
means for evaluating at least some of those recorded actions or responses to decide, or provide an inference as to, whether the user has attained a skill associated with a node,
access prevention means operative in respect of at least a particular node of a network at least for some of the time, for preventing the user from choosing an activity module associated with that particular node according to some criterion based, at least in part, on the results of said evaluation for at least one activity module associated with at least one node of said network, and
a search engine for allowing the user to enter one or more keywords and returning a list of activity modules that are associated with the keywords and that are not prohibited to the user by the preventing means.

106. A computer assisted learning apparatus comprising:
a database having at least one developmental network, the network having a plurality of nodes, each representing a developmental skill or an inference concerning such a skill, and links between nodes, each link being between a node for a first skill and a node for a second easier skill, the links providing alternate paths between the nodes, the database further comprising interactive activity modules associated with the nodes,
means for allowing an interactive activity module defined in the database to be chosen by a user,
means for presenting a selected activity module defined in the database to the user whether visually, audibly or otherwise,
means for allowing the user to interact with an activity so presented,
means for recording at least some of the user's actions during or responses to the presented activity,
means for evaluating at least some of those recorded actions or responses to decide, or provide an inference as to, whether the user has attained a skill associated with a node,
access prevention means operative in respect of at least a particular node of a network at least for some of the time, for preventing the user from choosing an activity module associated with that particular node according to some criterion based, at least in part, on the results of said evaluation for at least one activity module associated with at least one node of said network,
means for operating on a network defined by a set of developmental criteria and whose representation records those criteria and the degree of difficulty of individual nodes of the network with respect to those criteria, and

29 selection means for selecting, from the nodes in a network allowed to the user by said access prevention means, one or more nodes having a selected degree of difficulty with respect to the developmental criteria, said selection means being arranged to offer the user a choice among a group of nodes selected by said selection means only after the size of that group is below a certain size.

107. The apparatus as claimed in claim 106 wherein said selected degree or degrees of difficulty with respect to a particular developmental criterion is a certain degree of difficulty and all possible greater degrees of difficulty with respect to that developmental criterion.

108. The apparatus a claimed in claim 106 wherein if the said group of nodes is above said certain size the selection means is arranged to adjust, or allow the user to adjust, the degrees of difficulty used to make said selection of nodes.

109. A method for providing computer assisted learning comprising:

providing a database having at least one developmental network, the network having a plurality of nodes, each representing a developmental skill or an inference concerning such a skill, and links between nodes, each link being between a node for a first skill and a node for a second easier skill, the links providing alternative paths between the nodes, the database further including interactive activity modules associated with the nodes, allowing an interactive activity module defined in the database to be chosen by a user, presenting a selected activity module defined in the database to the user, allowing the user to interact with an activity so presented, recording at least some of the user's actions during or responses to the presented activity, evaluating at least some of those recorded actions to provide an indication as to whether the user has attained a skill associated with a node, preventing, for at least some period of time, the user from choosing an activity module associated with at least a particular node according to some criterion based, at least in part, on the results of the said evaluation for at least one activity module associated with at least one node of the said network, and presenting a list of activity modules accessible to the user with the activity modules for nodes in the same network as a node associated with the last activity module attempted by the user being presented first.

110. A method for providing computer assisted learning comprising:

providing a database having at least one developmental network, the network having a plurality of nodes, each representing a developmental skill or an inference concerning such a skill, and links between nodes, each link being between a node for a first skill and a node for a second easier skill, the links providing alternative paths between the nodes, the database further including interactive activity modules associated with the nodes, the network having a set of developmental criteria and wherein the representation of the network records those criteria and the degree of difficulty of individual nodes of the network with respect to those criteria, allowing an interactive activity module defined in the database to be chosen by a user, presenting a selected activity module defined in the database to the user, allowing the user to interact with an activity so presented,

30 recording at least some of the user's actions during or responses to the presented activity, evaluating at least some of those recorded actions to provide an indication as to whether the user has attained a skill associated with a node, preventing, for at least some period of time, the user from choosing an activity module associated with at least a particular node according to some criterion based, at least in part, on the results of the said evaluation for at least one activity module associated with at least one node of the said network, selecting, from the nodes in the network allowed to the user by the access preventing, one or mode nodes having a selected degree of difficulty with respect to the developmental criteria, and offering the user a choice among a group of nodes selected by selecting only once the size of that group is below a certain size.

111. The method as claimed in claim 110 wherein if the group of nodes is above the certain size selecting including adjusting or allowing the user to adjust, the degrees of difficulty used to make said selection of nodes.

112. A computer assisted learning apparatus comprising:

a database having at least one developmental network, the network having a plurality of nodes, each representing a developmental skill or an inference concerning such a skill, and links between nodes, each link being between a node for a first skill and a node for a second easier skill, the links providing alternative paths between the nodes, the database further including interactive activity modules associated with the nodes, means for allowing an interactive activity module defined in the database to be chosen by a user, means for presenting a selected activity module defined in the database to the user, means for allowing the user to interact with an activity so presented, means for recording at least some of the user's actions during or responses to the presented activity, means for evaluating at least some of those recorded actions to provide an indication as to whether the user has attained a skill associated with a node, means for preventing, for at least some period of the time, the user from choosing an activity module associated with at least a particular node according to some criterion based, at least in part, on the results of the said evaluation for at least one activity module associated with at least one node of the said network, means for allowing navigation between related networks, the representation of said networks including links for said navigation, and means for moving between one network and another linked to it, to a particular node in the latter network, the identity of that node being recorded in the representation of said networks.

113. A computer assisted learning apparatus comprising:

a database having at least one developmental network, the network having a plurality of nodes, each representing a developmental skill or an inference concerning such a skill, and links between nodes, each link being between a node for a first skill and a node for a second easier skill, the links providing alternative paths between the nodes, the database further including interactive activity modules associated with the nodes, the network is defined by a set of developmental criteria and wherein the representation of the network records those criteria, means for allowing an interactive activity module defined in the database to be chosen by a user, means for presenting a selected activity module defined in the database to the user, means for allowing the user to interact with an activity so presented, means for recording at least some of the user's actions during or responses to the presented activity, means for evaluating at least some of those recorded actions to provide an indication as to whether the user has attained a skill associated with a node, means for preventing, for at least some period of the time, the user from choosing an activity module associated with at least a particular node according to some criterion based, at least in part, on the results of the said evaluation for at least one activity module associated with at least one node of the said network, means for selecting, from the nodes in a network allowed to the user by said access preventing, one or more nodes having a selected degree of difficulty with respect to the developmental criteria, and means for offering the user a choice among a group of nodes selected by said selecting only once the size of that group is below a certain size.

114. The apparatus of claim 113 wherein if said group of nodes is above said certain size said selecting includes adjusting or allowing the user to adjust, the degrees of difficulty used to make said selection of nodes.

* * * * *

UNITED STATES PATENT AND TRADEMARK OFFICE
CERTIFICATE OF CORRECTION

PATENT NO. : 6,793,498 B1
DATED : September 21, 2004
INVENTOR(S) : Aubrey Nunes

It is certified that error appears in the above-identified patent and that said Letters Patent is hereby corrected as shown below:

Column 1,
Line 26, delete "(dis) ability" and insert -- ability --;
Line 44, delete "selected" and insert -- chosen by the user --;
Line 50, delete "or" and insert -- of --;
Line 58, delete "accessing" and insert -- choosing --;
Line 64, delete "Further," and insert -- Further --;
Line 66, delete "a" and insert -- at --.

Column 2,
Line 40, delete "encyclopaedia" and insert -- encyclopedia --;
Line 44, delete "rack" and insert -- track --.

Column 3,
Line 14, delete "or" and insert -- for --;
Line 25, delete "no" and insert -- not --;
Line 26, delete "nose" and insert -- node --;
Line 42, delete "there such" and insert -- there is such --.

Column 4,
Line 5, delete "encyclopaedia" and insert -- encyclopedia --;
Line 28, delete "or" and insert -- of --;
Line 45, delete "fox" and insert -- for --;
Line 62, delete "On" and insert -- When --.

Column 5,
Line 1, delete "Shows" and insert -- shows --;
Line 3, delete "numeracy" and insert -- numeric --;
Line 15, delete "he or he" and insert -- he or she --;
Line 18, delete "shove" and insert -- have --;
Lines 40, 41, 44, 45, 59, 54, 58 and 61, delete "encyclopaedia" and insert -- encyclopedia --;
Line 48, delete "feedback" and insert -- feed back --.

UNITED STATES PATENT AND TRADEMARK OFFICE
CERTIFICATE OF CORRECTION

PATENT NO. : 6,793,498 B1
DATED : September 21, 2004
INVENTOR(S) : Aubrey Nunes

It is certified that error appears in the above-identified patent and that said Letters Patent is hereby corrected as shown below:

Column 6,
Line 22, delete "incompleted" and insert -- uncompleted --.

Column 7,
Line 6, delete "he" and insert -- the --;
Line 11, delete "or" and insert -- for --;
Line 54, delete "encyclopaedia" and insert -- encyclopedia --;
Line 54, delete "This, it does" and insert -- This is done --.

Column 8,
Line 12, delete "kept being".

Column 9,
Line 52, delete "are" and insert -- add --;
Line 60, delete "not" and add -- her --.

Column 10,
Line 25, delete "developemental" and insert -- developmental --;
Lines 30 and 31, delete "organised" and insert -- organized --;
Lines 38, 44 and 59, delete "encyclopaedia" and insert -- encyclopedia --;
Line 60, delete "categorised" and insert -- categorized --;
Line 63, delete "keyword" and insert -- keywords --.

Column 11,
Line 6, delete "colour" and insert -- color --;
Lines 19 and 20, delete "recognised" and insert -- recognized --;
Line 25, delete "categorised" and insert -- categorized --;
Line 30, delete "For" and insert -- for --;
Line 31, delete "usefull" and insert -- useful --;
Line 46, delete "is";
Lines 52 (2 places), 53, 57, 59 and 63, delete "lift" and insert -- elevator --;
Line 65, delete "heirachy" and insert -- hierarchy --.

UNITED STATES PATENT AND TRADEMARK OFFICE
CERTIFICATE OF CORRECTION

PATENT NO. : 6,793,498 B1
DATED : September 21, 2004
INVENTOR(S) : Aubrey Nunes

It is certified that error appears in the above-identified patent and that said Letters Patent is hereby corrected as shown below:

Column 12,
Line 2, delete "nay" and insert -- any --;
Line 5, delete "or" and insert -- for --;
Line 12, delete "Th" and insert -- The --;
Line 13, delete "13" and insert -- 18 --;
Line 17, delete "13" and insert -- 18 --;
Line 20, delete "wound" and insert -- would --;
Line 26, delete "if" and insert -- 16 --;
Line 32, delete "progress" and insert -- process --;
Line 33, delete "skill" and insert -- skills --;
Line 40, delete "Fort" and insert -- for --;
Line 43, delete "1÷1" and insert -- 1 +1 --;
Line 58, delete "of" and insert -- if --.

Column 13,
Line 6, insert (at the beginning of the line) -- a --;
Line 18, delete "Network" and insert -- network --;
Line 20, delete "2 +2" and insert -- 2x2 --;
Line 35, delete "no" and insert -- not --;
Line 39, delete "as" and insert -- is --;
Line 44, delete "differences" and insert -- difference --;
Line 65, delete "favour" and insert -- favor --.

Column 14,
Line 1, delete "favoured" and insert -- favored --;
Line 10, delete "analyzed" and insert -- analysed --;
Line 11, delete "categorised" and insert -- categorized --;
Line 15, delete "he" and insert -- the --;
Line 22, delete "favour" and insert -- favor--;
Line 27, delete "placeholding" and insert -- place holding --;
Line 64, delete "ant" and insert -- and --.

UNITED STATES PATENT AND TRADEMARK OFFICE
CERTIFICATE OF CORRECTION

PATENT NO. : 6,793,498 B1
DATED : September 21, 2004

It is certified that error appears in the above-identified patent and that said Letters Patent is hereby corrected as shown below:

Column 15,
Line 12, delete "8-2" and insert -- 8 +2 --;
Line 31, delete "input" and insert -- inputs --;
Line 37, delete "1 2/3" and insert -- 2/3 --;
Line 53, delete "wall" and insert -- will --.

Column 16,
Line 13, delete "numeracy" and insert -- numeric --;
Line 25, delete "organise" and insert -- organize --;
Line 31, delete "a least" and insert -- at least --;
Line 39, delete "," and insert -- . --;
Line 55, delete "my" and insert -- may--;
Line 59, delete "his" and insert -- himself --.

Column 17,
Line 12, delete "colour" and insert -- color --;
Lines 20 and 26, delete "he" and insert -- the --;
Line 43, delete "an" and insert -- can --;
Line 47, delete "stride" and insert -- stripe --;
Line 59, delete "maximise" and insert -- maximize --;
Line 66, delete "or" and insert -- of --.

Column 19,
Line 8, delete "or" and insert -- for --;
Line 23, delete "aural" and insert -- oral --;
Line 24, delete "aural" and insert -- oral --;
Line 28, delete "she" and insert -- the --;
Line 41, delete "he" and insert Column 20,
Line 6, delete "data-base" and insert -- database --.

UNITED STATES PATENT AND TRADEMARK OFFICE
CERTIFICATE OF CORRECTION

PATENT NO. : 6,793,498 B1
DATED : September 21, 2004
INVENTOR(S) : Aubrey Nunes

It is certified that error appears in the above-identified patent and that said Letters Patent is hereby corrected as shown below:

Column 27,
Line 19, delete "sand" and insert -- and --.

Column 29,
Line 14, delete "a" and insert -- as --.

Signed and Sealed this

Twenty-third Day of November, 2004

JON W. DUDAS
*Director of the United States Patent and Trademark Office*